United States Patent Office 3,084,370
Patented Apr. 9, 1963

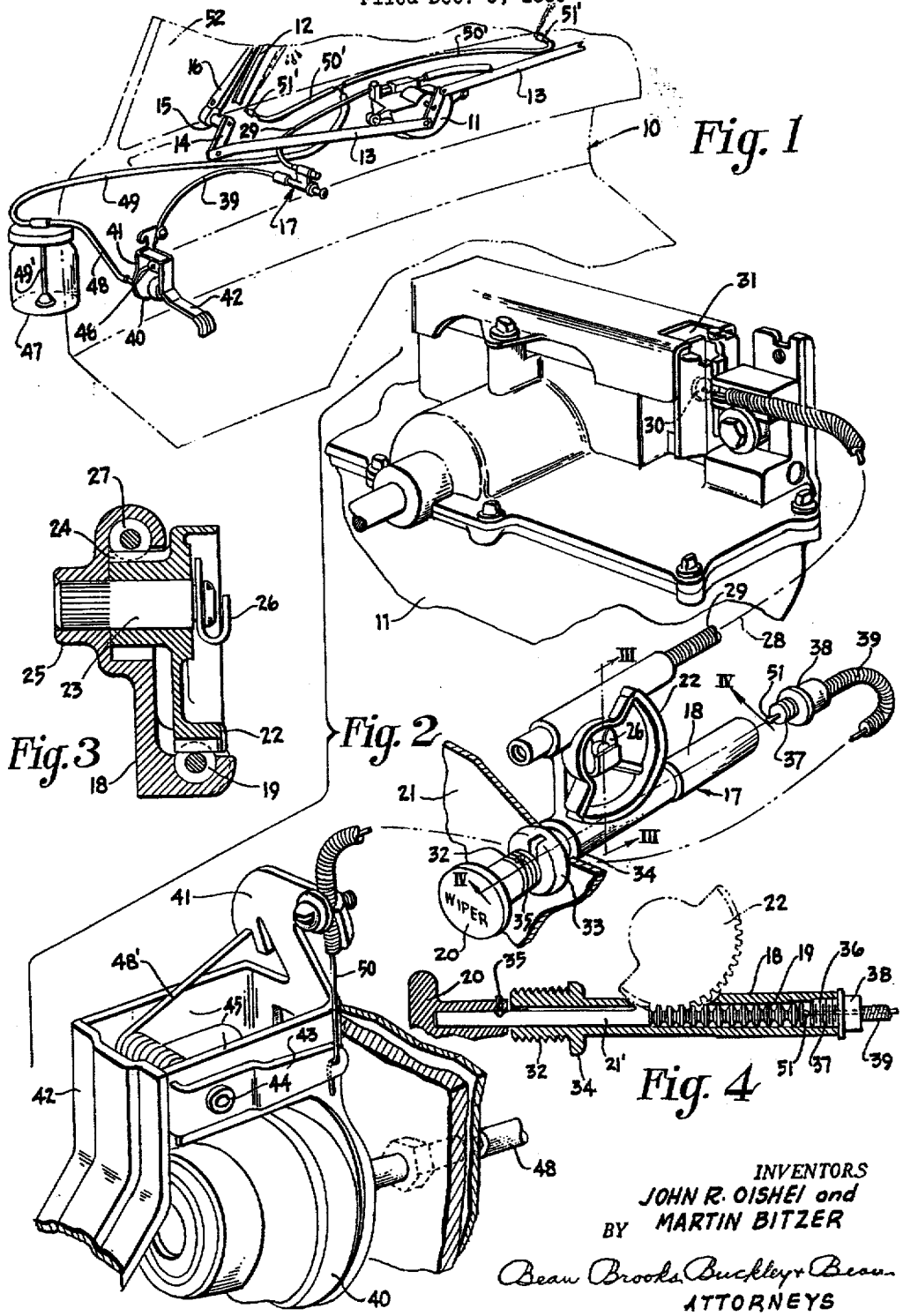

3,084,370
WINDSHIELD CLEANING SYSTEM
John R. Oishei, Buffalo, and Martin Bitzer, Kenmore,
N.Y., assignors to Trico Products Corporation, Buffalo,
N.Y.
Filed Dec. 9, 1959, Ser. No. 858,465
4 Claims. (Cl. 15—250.02)

The present invention relates to a windshield washer system including an improved control therefor.

In Patent No. 2,743,473 a basic coordinated windshield washer system is disclosed wherein the actuation of a foot washer pump causes actuation of a wiper-motor, to provide joint washer-wiper operation for cleaning a windshield. In accordance with the present invention, a manual control is provided which may be placed in an automotive vehicle for controlling a wiper-motor in a conventional manner. This control may be installed without the installation of an accompanying washer system. However, the control contains structure which permits it to receive a connection from a subsequently installed washer pump to provide wiper operation when the washer is actuated, without in any way interfering with normal operation of the previously installed wiper-motor by itself. Furthermore, the above-mentioned control of the present invention provides a semi-automatic operation in that after the foot control is actuated to initiate operation of the washer with accompanying wiper-motor operation, the control will remain in motor actuating position until such time as it is manually deactuated. This permits the wiper-motor to remain in operation for as long a time after the cessation of washer pump operation as is desired by the vehicle operator to insure the wiping of all excess moisture from the windshield. Because the for terminating wiper-motor operation is manually actuable, there is no need for the vehicle operator to retain his foot on the washer actuating control for a longer time than is required to project the solvent onto the windshield, nor is there any requirement for the operator to again actuate the foot control to stop wiper-motor operation. In other words, while the force which can be exerted by the foot is utilized to actuate the pump to project solvent onto the windshield and incidentally start the wiper-motor, the terminating of wiper-motor operation is effected by a simple manual manipulation.

It is accordingly an important object of the present invention to provide a universal semi-automatic control which may be installed in a vehicle solely for actuating a wiper-motor or may also be attached to a subsequently installed washer pump without any requirement for extensive modifications of the vehicle or the wiper system, to thereby provide coordinated washer-wiper operation.

It is another object of the present invention to provide a coordinated windshield washer system wherein foot power is utilized to pump a solvent onto the windshield and incidentally start a wiper-motor, and a manual manipulation of a wiper control is utilized to terminate wiper-motor operation at any time the vehicle operator desires, thereby obviating the necessity for the vehicle operator to effect any manipulation of the wiper-motor by the use of his feet for the purpose of terminating wiper-motor operation. Other objects and attendant advantages of the present invention will readily be perceived understood when the following portions of the specification are read in conjunction with the accompanying drawings wherein:

FIG. 1 is a fragmentary perspective view of an automotive vehicle incorporating the improved washer system hand control of the present invention;

FIG. 2 is an enlarged perspective view showing the salient components of the washer system;

FIG. 3 is a view taken along line III—III of FIG. 2 showing a portion of the internal mechanism of the manual wiper control; and FIG. 4 is a view, partly in cross-section, taken along line IV—IV of FIG. 2 and showing a portion of the internal mechanism of the improved control.

In FIG. 1 an automotive vehicle 10 is shown having a wiper-motor 11 suitably mounted on the firewall for driving wiper blades 12 (only one shown) through links 13, 14, rockshaft 15, and wiper arm 16, all of the above elements being coupled in any conventional manner as is well-known in the art.

In order to actuate motor 11, wiper control 17, mounted on the vehicle dashboard is actuated. This control includes a housing 18 having a rack 19 (FIG. 4) mounted therein. The rack is connected at its end to wiper control knob 20 extending from the front 21 of the dashboard. When wiper operation is desired, the vehicle operator need merely pull wiper knob 20 (FIGS. 2 and 4) to the left to cause rack 19 which is formed at the end of stem 21' to move to the left also. This will cause pinion 22, which is pivotally mounted on housing 18 and which is in mesh with rack 19, to pivot in a clockwise direction about shaft 23, having pinion 24 also mounted theron. Pinions 22 and 24 may be integrally formed as shown in FIG. 3. Shaft 23 is press-fitted into the end 25 of housing 18 and a spring clip 26 retains pinions 22—24 in position on shaft 23. A second rack 27, which is in engagement with pinion 24, is mounted in housing 18 for movement in a direction parallel to the movement of rack 19. Thus when the wiper control knob 20 is moved to the left in FIGS. 2 and 4, the rotation of pinion 24 in a clockwise direction will cause a movement to the right of rack 27 since the end of rack 27 is coupled to the core 28 of flexible cable 29 and since the end 30 of core 28 is coupled to wiper-motor slide valve 31. The foregoing movement to the left of wiper control knob 20 will result in moving slide valve 31 to a position which starts wiper-motor 11 in operation. Conversely, when it is desired to stop wiper-motor operation, knob 20 is pressed to the right and core 28 of cable 29 will move to the left in FIG. 2 to return the wiper-motor slide valve 31 to an off position.

The control 17 is installed in the dashboard in the following manner: The threaded portion 32 is placed through a suitable aperture not shown. Thereafter nut 33 is tightened onto threads 32 so as to hold the control 17 firmly in position because the dashboard 21 is sandwiched between protuberance 34 on the body 18 of the control and nut 33. Thereafter wiper control knob 20 is slid onto shaft 21' and rigidly secured thereto by set screw 35.

If the installation is to be used without a washer installation, no other apparatus is necessary, it being understood as explained in detail above that a pulling motion tion will cause it to turn off. However, in accordance with the present invention, control 17 is equipped to receive a connection from a washer installation so that the washer may be installed subsequent to the wiper without in any way interfering with the above-described operation of the wiper. In this respect one end of housing 18 in which rack 19 rides is tapped at 36 to receive externally threaded portion 37 of fitting 38 (FIG. 2) mounted on one end of flexible cable 39 which is adapted to be actuated by the subsequently installed washer.

The washer in the present instance is of the foot-operated type wherein a bulb 40 is mounted on a bracket 41 which is, in turn, suitably secured to the firewall of the vehicle. Mounted on bracket 41 is a foot pedal 42 having arm 43 rigidly coupled thereto. Arm 43 receives pin 44 which is journalled in legs 45 of the bracket, the other end of pin 44 being received in arm 46 (FIG. 1) which is also rigidly secured to foot pedal 42. The foot pump assembly obtains its supply of solvent from washer reservoir 47. In this respect when foot pedal 42 is depressed, the solvent within bulb 40 is forced through conduits 48, 49, 50', and nozzles 51' and onto the associated windshield 52. A check valve, not shown, within the washer reservoir assembly prevents the solvent which is forced through the above-described path from returning to the reservoir. After the operator has finished depressing pedal 42 and releases it, spring 48', having a portion encircling pin 44, will return pedal 42 to its deactuated position. The natural resilience of bulb 40 will cause it to return to its fully expanded position and in so doing it will take a charge of solvent in from reservoir 47 through conduits 49' and 48. A check valve, not shown, is provided within the reservoir assembly for permitting this action to take place by preventing air from being drawn in from nozzles 51'.

When pedal 42 is depressed in the above-described manner for initiating washer operation, core 50 of flexible cable 39, having one end attached to arm 43, will be moved to cause the end 51 of core 50 to abut rack 19 and thereby move the wiper control 17 to a position which will cause the wiper-motor to operate. After pedal 42 returns to its normal position, the end 51 of core 50 will be pulled to its position fully to the right in FIG. 4. However, since there is no positive connection between end 51 and rack 19, the wiper control 17 will remain in an on position because rack 19 will remain in its position to the left of that shown in FIG. 4.

The vehicle operator will permit the wipers to continue in operation until such time as he desires to terminate such operation. When the moisture has been dried from the windshield, it is only necessary for the vehicle operator to manually engage wiper control knob 20 and push it to the position shown in FIGS. 2 and 4 whereby automatic parking mechanism within motor 11 will cause the wipers 12 to park. It can readily be seen that foot power is utilized to actuate the foot pump and that continued engagement of foot pedal 42 is unnecessary for the purpose of causing wiper-motor 11 to continue in operation. Furthermore, when it is desired to terminate wiper-motor operation it is unnecessary for the vehicle operator to again effect a foot operation, since it is only necessary for him to deactuate control 17 by manual manipulation as described in detail above.

It can thus be seen that an improved wiper system having an improved control therein has been disclosed which not only permits a washer pump to be subsequently installed in an existing vehicle with a minimum of effort and without in any way interfering with proper operation of the preexisting wiper installation, but also provides continued wiper operation for a desired length of time after washer action, dependent on the operator's requirements, and permits the operator to terminate wiper-motor operation by a simple manual manipulation.

has been disclosed, it is to be understood that it is not limited thereto, but may be otherwise embodied within the scope of the following claims.

What is claimed is:

1. A control for selectively actuating a windshield wiper-motor either in response to the actuation of a washer pump or in response to manual actuation comprising a housing adapted to be mounted on a vehicle, a control knob mounted on said housing, first rack means in said housing coupled to said control knob, gear means in said housing in mesh with said first rack means, second rack means in said housing spaced from said first rack means and in engagement with said gear means, means coupled between said second rack means and a wiper-motor whereby the actuation of said first rack means by the manipulation of said control knob results in the actuation of said wiper-motor, and means coupled to said first rack means with a lost-motion connection to cause movement of said first rack means and said control knob when a windshield washer is actuated to thereby initiate operation of said wiper-motor, said lost-motion connection permitting said first rack means and control knob to remain in a wiper-motor actuating position until said control knob is manipulated to a wiper motor deactuating position.

2. A control for actuating a windshield wiper-motor comprising a housing adapted to be mounted on a vehicle, a control knob mounted on said housing, a rack in said housing coupled to said control knob, a gear in said housing in mesh with said rack, means including flexible conduit means coupling said gear to a wiper-motor control whereby the manual manipulation of said control knob actuates said wiper-motor, and means in said housing adapted to be connected to a flexible cable from a washer unit for providing a lost-motion connection with said rack, whereby said rack may be utilized to move said gear and said control knob to initiate wiper-motor operation in response to the movement of said flexible cable resulting from the actuation of said washer, and whereby said control knob may be manually actuated independently of said washer unit for either starting or terminating sole wiper-motor operation or for terminating wiper-motor operation at any desired time after said rack and said control knob have been moved as a result of said flexible cable having initiated wiper motor operation.

3. A control for actuating a windshield wiper-motor comprising a housing adapted to be mounted on a vehicle, a control knob mounted in said housing, means for coupling said control knob to a wiper-motor whereby the manipulation of said control knob actuates said wiper-motor, and connecting means associated with said housing and adapted to be coupled to a mechanical linkage extending from a remotely-positioned washer unit, and a lost motion connection between said mechanical linkage and said control knob whereby said mechanical linkage may be utilized to actuate said control knob and initiate wiper-motor operation conjointly with the actuation of said washer and whereby said lost motion connection permits said control knob to be actuated independently for either starting or terminating sole wiper-motor operation or for terminating wiper-motor operation at any desired time after the termination of washer operation following the joint washer-wiper operation initiated by the mechanical linkage of the washer unit.

4. A control for actuating a windshield wiper motor comprising a housing adapted to be mounted on a vehicle, a control knob mounted on said housing, first mechanical linkage means in said housing in operative engagement with said control knob, means on said housing adapted to receive second mechanical linkage means adapted to be actuated in response to the actuation of a windshield washer, and a lost motion connection between said first mechanical linkage means and said second mechanical linkage means whereby said first mechanical linkage means wiper motor operation as a result of the actuation of said second mechanical linkage means in response to the actuation of said washer and whereby said control knob may be manually actuated independently of said second mechanical linkage means for actuating said first mechanical linkage means for either starting or terminating sole wiper motor operation and whereby said control knob may be manually actuated for terminating the wiper motor operation which was started as a result of the initiation of washer operation.

References Cited in the file of this patent

UNITED STATES PATENTS

| | | |
|---|---|---|
| 2,869,164 | Neufeld | Jan. 20, 1959 |
| 2,889,569 | Riester | June 9, 1959 |
| 2,957,193 | Hart et al. | Oct. 25, 1960 |
| 2,961,687 | Krohm | Nov. 29, 1960 |

UNITED STATES PATENT OFFICE
CERTIFICATE OF CORRECTION

Patent No. 3,084,370 April 9, 1963

John R. Oishei et al.

It is hereby certified that error appears in the above numbered patent requiring correction and that the said Letters Patent should read as corrected below.

Column 1, line 34, after "the", second occurrence, insert -- control --.

Signed and sealed this 1st day of October 1963.

(SEAL)
Attest:

ERNEST W. SWIDER

Attesting Officer

DAVID L. LADD

Commissioner of Patents